United States Patent
Daly et al.

(10) Patent No.: US 12,549,641 B2
(45) Date of Patent: Feb. 10, 2026

(54) MONITORING TRACKER ACTIVITY OF APPLICATIONS ON AN ELECTRONIC DEVICE

(71) Applicant: Apple Inc., Cupertino, CA (US)

(72) Inventors: Marion Patricia Daly, Sunnyvale, CA (US); Lucas J. Russe, Aurora, IL (US); Franco Travostino, San Jose, CA (US); Joshua V. Graessley, San Jose, CA (US); Brent A. Fulgham, San Jose, CA (US); Jeffrey C. Twu, Sunnyvale, CA (US); Maciej Stachowiak, San Francisco, CA (US); James P. Wood, Gilroy, CA (US)

(73) Assignee: Apple Inc., Cupertino, CA (US)

( * ) Notice: Subject to any disclaimer, the term of this patent is extended or adjusted under 35 U.S.C. 154(b) by 258 days.

(21) Appl. No.: 17/722,297

(22) Filed: Apr. 15, 2022

(65) Prior Publication Data

US 2022/0385737 A1 Dec. 1, 2022

Related U.S. Application Data

(60) Provisional application No. 63/195,669, filed on Jun. 1, 2021.

(51) Int. Cl.
*H04L 67/54* (2022.01)
*G06F 11/34* (2006.01)
*H04L 67/50* (2022.01)

(52) U.S. Cl.
CPC ........ *H04L 67/535* (2022.05); *G06F 11/3438* (2013.01); *H04L 67/54* (2022.05)

(58) Field of Classification Search
CPC ............ H04L 63/0442; H04L 63/1425; H04L 63/0236; H04L 63/0428; H04L 63/141; H04L 67/02
See application file for complete search history.

(56) References Cited

U.S. PATENT DOCUMENTS

| | | | |
|---|---|---|---|
| 9,692,844 B2 | 6/2017 | Messenger et al. | |
| 10,983,945 B2 | 4/2021 | Molettiere et al. | |
| 11,172,836 B1* | 11/2021 | Monteiro | A61B 5/683 |
| 2013/0152153 A1* | 6/2013 | Weiser | H04L 65/1069 |
| | | | 726/1 |
| 2014/0320284 A1* | 10/2014 | Messenger | A61B 5/1118 |
| | | | 340/527 |

(Continued)

OTHER PUBLICATIONS

Distributed systems explained by Cisco, Aug. 9, 2023.*

*Primary Examiner* — Emmanuel L Moise
(74) *Attorney, Agent, or Firm* — BAKERHOSTETLER

(57) ABSTRACT

The present disclosure provides systems and methods for monitoring tracker activity for applications on an electronic device. A monitoring process running on an electronic device is configured to monitor network connections of at least a first application running on the electronic device to identify network connections that connect to a network endpoint associated with an activity tracker. Based on the monitoring, tracker monitoring information is generated for at least the first application. The tracker monitoring information identifies activity tracking initiated by the first application. Based on the tracker monitoring information, the monitoring process performs an action.

20 Claims, 8 Drawing Sheets

(56) References Cited

U.S. PATENT DOCUMENTS

| | | | |
|---|---|---|---|
| 2015/0012963 A1* | 1/2015 | Gupta | H04L 63/104 |
| | | | 726/1 |
| 2015/0178772 A1* | 6/2015 | Sheth | G06Q 30/0255 |
| | | | 705/14.66 |
| 2018/0276382 A1* | 9/2018 | Khandhar | G06F 21/563 |
| 2019/0166203 A1* | 5/2019 | Sarlandie de la Robertie | |
| | | | G06F 9/5027 |
| 2021/0136038 A1* | 5/2021 | Stokes | H04L 63/0442 |
| 2021/0157874 A1* | 5/2021 | Golan | G06F 16/9558 |
| 2021/0383059 A1* | 12/2021 | Schultz | G06F 40/14 |
| 2021/0409276 A1* | 12/2021 | Marozas | H04L 43/0817 |
| 2022/0284483 A1* | 9/2022 | Gonen | G06Q 30/0277 |

* cited by examiner

MONITORING TRACKER ACTIVITY OF APPLICATIONS ON AN ELECTRONIC DEVICE

CROSS REFERENCE TO RELATED APPLICATIONS

This application claims the benefit of priority to U.S. Provisional Patent Application No. 63/195,669, entitled "Monitoring Tracker Activity of Applications on an Electronic Device," filed on Jun. 1, 2021, the disclosure of which is hereby incorporated herein in its entirety.

TECHNICAL FIELD

The present description relates to electronic devices, and, more particularly, for example, to monitoring tracker activity of applications on an electronic device.

BACKGROUND

In today's world, huge volumes of data pertaining to various tasks, operations, and activities of users' computing devices are generated, exchanged, and analyzed every day. In this huge volume of user data, enterprises and companies have taken up special interest in user data, that is indicative of, for example, user's browsing activity, user's content viewing activity, user's shopping activity, etc. Based on such user data, the companies and enterprises are able to offer customized services and target advertisements to users, with the aim of resonating with users' habits.

BRIEF DESCRIPTION OF DRAWINGS

Certain features of the subject technology are set forth in the appended claims. However, for purpose of explanation, several implementations of the subject technology are set forth in the following figures.

DETAILED DESCRIPTION

The detailed description set forth below is intended as a description of various configurations of the present disclosure and is not intended to represent the only configurations in which the present disclosure can be practiced. The appended drawings are incorporated herein and constitute a part of the detailed description. The detailed description includes specific details for the purpose of providing a thorough understanding of the present disclosure. However, the present disclosure is not limited to the specific details set forth herein and can be practiced using one or more other implementations. In one or more implementations, structures and components are shown in block diagram form in order to avoid obscuring the concepts of the present disclosure.

Electronic devices, such as smartphones and laptops, can provide applications for performing various tasks, activities, and operations. As an example, a user may use a travel-booking application for booking airline tickets, hotel stays, etc. In another example, the user may use a web browser application for visiting news websites, stock websites, shopping websites, etc. Furthermore, the user may access an email application for sending and receiving emails.

In some circumstances, an application running on an electronic device may be configured to establish network connections with network endpoints, such as, for example, servers, that are associated with activity tracking. Subsequent to the establishment of the network connections, user data may be captured by the activity tracker network endpoints.

In some cases, the network connections to activity tracker endpoints are established based on the executed code of the application itself. In other cases, network connections to activity tracker endpoints are established based on user interaction with content being provided by the application. Captured user data can be used by the activity trackers for any purpose, which can be unknown to the user. Whether the activity tracking is initiated by an application or by content within an application, it may be desirable for the user to be informed about any tracking of their activity associated with applications at their device.

As such network connections are established in the background during the user's usage of the applications, the user may not be aware of their establishment and thus, may not be aware that the user's data is being collected. Aspects of the subject technology provide for monitoring tracker activity of applications on an electronic device, such that actions can be taken discretely with respect to application-initiated tracking and/or content-initiated tracking.

Figure 1:
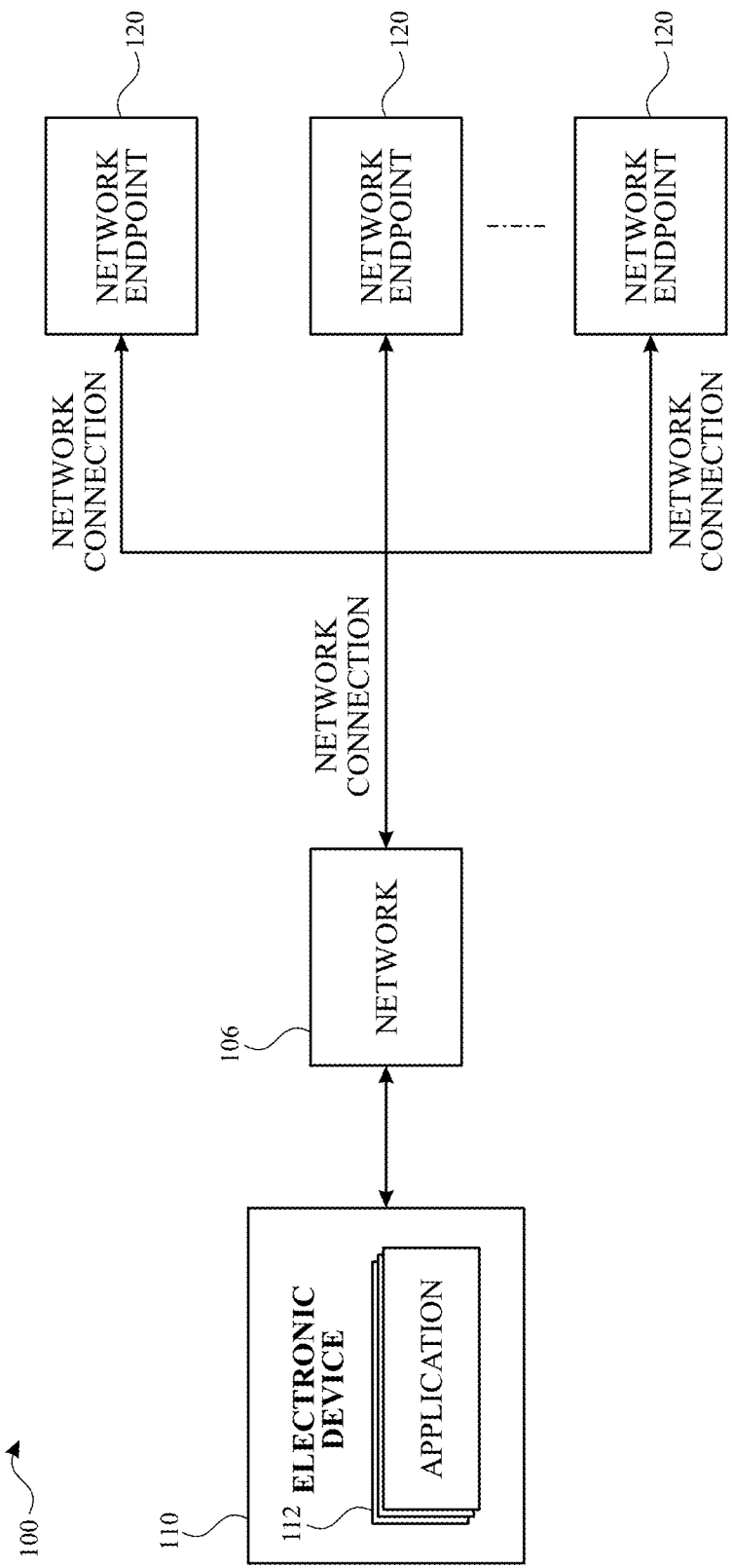
FIG. 1 illustrates an example network environment in accordance with one or more implementations of the present disclosure.

FIG. 1 illustrates an example network environment 100 in accordance with one or more implementations of the present disclosure. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes a network 106, an electronic device 110 and a plurality of network endpoints 120 (e.g., servers). The network 106 may communicatively (directly or indirectly) couple the electronic device 110 and one or more of the network endpoints 120. In one or more implementations, the network 106 may be an interconnected network of devices that may include, or may be communicatively coupled to, the Internet. For explanatory purposes, the network environment 100 is illustrated in FIG. 1 as including the electronic device 110, and the network endpoints 120, however, the network environment 100 may include any number of electronic devices and any number of network endpoints.

The electronic device 110 may be, for example, a desktop computer, a portable electronic device such as a laptop computer, a smartphone, a peripheral device (e.g., a digital camera, headphones), a tablet device, a wearable device such as a watch, a band, and the like. The electronic device 110 may be, and/or may include all or part of, the electronic system discussed below with respect to FIG. 9.

The network endpoints 120 may be, for example, servers to which the electronic device 110 may connect or communicate with using respective domain names of the servers for availing different services. For instance, a user of the electronic device 110 may perform tasks, book flights, read news, access social media platforms, etc., using one or more applications 112 installed at the electronic device 110. For these aforementioned activities or any other activities, the applications 112 may connect to corresponding network endpoints 120, for example, by establishing network connections based on domain names. In an example, in addition to the network endpoints 120 that are connected to for services provided by an application 112, one or more of the network endpoints 120 may be associated with activity trackers that track user interaction with an application and/or content provided by the application on the electronic device 110.

In one or more implementations, a user may launch an application 112 on the electronic device 110. The application 112 may be any software application including, but not limited to, a browser application, an in-app browser, a social media application, a calculator application, a news reading application, etc. The application 112 may establish a plurality of network connections to a plurality of network endpoints in the network. For example, a user may launch or access a social media application that connects to one or more network endpoints (e.g., social media servers associated with the social media application and/or other content servers) to obtain social media content (e.g., posts, images, videos, etc. posted to the social medial server by the user and/or other users of other devices) for display in a user interface of the social media application. The social media content obtained by the social media application may include links to other content at other network endpoints.

The application may connect to the other network endpoints in order to obtain the other content for display in the user interface of the social media application. In some circumstances, the social media application may also include code that causes the social media application to connect to network endpoints associated with activity trackers. In some circumstances, the social media content, the links to the other content, and/or subsequent links from the other content, etc. can also cause the application to connect to network endpoints associated with activity trackers (e.g., the same activity trackers connected to based on the application code and/or other activity trackers). In another example, the user may be accessing an in-app browser that has several other links that when clicked by the user open up a web-browser or another application, thereby establishing network connections to various network endpoints. One or more of such network endpoints may be associated with activity trackers that may be tracking user activities on the application 112 and/or may be accessing user data via the application 112.

According to one or more implementations of the present disclosure, the electronic device 110 may be configured to monitor the network connections of the application 112 to identify the network connections that connect to network endpoints associated with activity trackers. Based on the monitoring, the electronic device 110 may be configured to generate tracker monitoring information for the application 112. The tracker monitoring information may include, for example, information identifying activity tracking that is initiated by the application. For instance, the tracker monitoring information may include domain names that are associated with known activity trackers and to which a network connection was initiated by the application 112.

For example, the application 112 may be a news application, which upon launching or during use may establish network connections with one or more network endpoints, some of which may be associated with activity trackers. To identify such network connections associated with the activity trackers, the electronic device 110 may be configured to compare domain names associated with each of the network endpoints with a list of domain names that corresponds to known activity trackers. In case of a match between one or more domain names of a network endpoint to which the application connected with domain names in the list, respective network endpoints may be identified as being associated with the activity trackers.

When it is determined that a network endpoint to which the application has connected is associated with an activity tracker, the electronic device 110 may further determine whether initiation of the activity tracker was triggered by the application itself or the content within the application. The electronic device 110 may, for example, use data communicated via the activity tracker network connection, contextual information associated with the activity tracker network connection, and/or one or more predefined parameters, to determine whether the application initiated the activity tracker or the content within the application initiated the activity tracker. The process of determining whether the application is initiated by the activity tracker or the content is explained in detail in the forthcoming description with reference to FIG. 2.

Subsequent to determining whether the activity tracker was initiated by the application or the content, electronic device 110 may generate tracker monitoring information for the application 210 based on monitoring of the network connections. In one example, the tracker monitoring information may identify activity tracking initiated by the application 210. In another example, the tracker monitoring information may further identify activity tracking initiated by the content within the application.

Based on the tracker monitoring information, the electronic device 110 may be configured to perform an action. The action may be, for example, storing the tracker monitoring information, e.g., for subsequent display, causing a display of the tracker monitoring information on a display of the electronic device 110, and/or other action(s), including but not limited to, terminating or blocking one or more of the network connections that connect to network endpoints associated with activity tracking.

Figure 2:
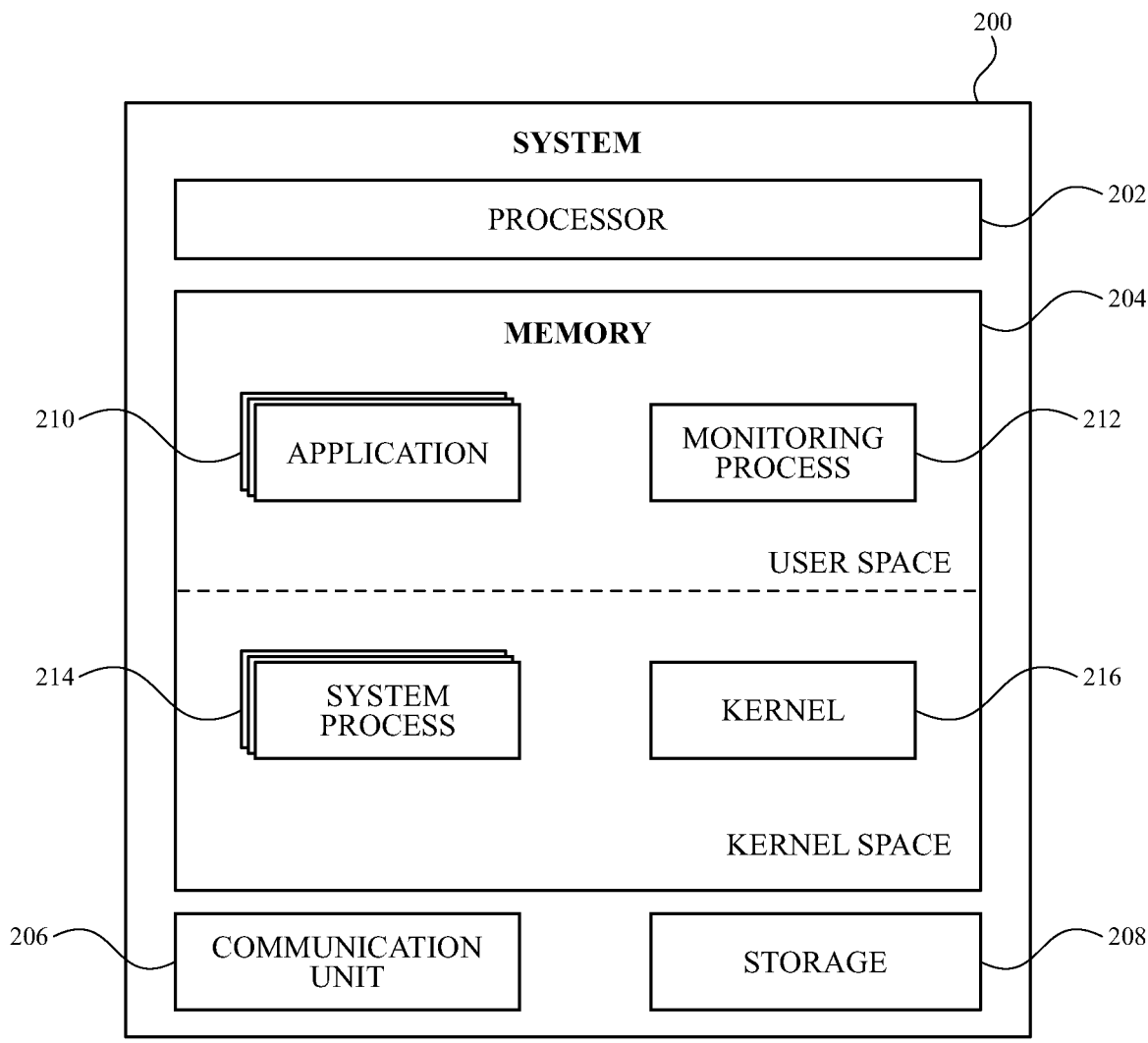
FIG. 2 illustrates an example system in accordance with one or more implementations of the present disclosure.

FIG. 2 illustrates an example system 200, in accordance with one or more implementations of the present disclosure. In an example, the system 200 may be implemented in computing devices, such as the electronic device 110. In another example, the system 200 may be implemented either in a single device or in a distributed manner in a plurality of devices.

In an example, the system 200 may include a processor 202, and memory 204 (memory device), a communication unit 206, and a storage 208, which may be either an internal storage or an external storage.

In an example, the processor 202 may be a single processing unit or a number of units, all of which may include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204.

The communication unit 206 may include one or more hardware units that support wired or wireless communication between the processor 202 and processors of other electronic devices.

The memory 204 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The memory 204 may store a plurality of applications 210, a monitoring process 212, a plurality of system processes 214 and an operating system's kernel 216. In an example, the monitoring process 212 may be another system process operating in a user space or a kernel space.

In one or more implementations, the monitoring process 212 may be executed by the processor 202 to monitor network connections of an application 210 running on the system 200 to identify network connections that connect to network endpoints associated with activity trackers. The monitoring process 212 may be another system process operating in the kernel space or the user space. In one or more implementations, the monitoring process 212 may be included in a network stack of the operating system.

The monitoring process 212 may identify the network connections that connect to a network endpoint associated with activity trackers by obtaining a domain name associated with the network endpoint connected to by one of the monitored network connections. When the domain name is obtained, the monitoring process 212 may determine whether the domain name is associated with an activity tracker or not.

In one or more implementations, the monitoring process 212 may make such a determination by comparing the domain name to a predetermined list of domain names corresponding to known activity trackers. In various examples, such a list may be generated at the device or obtained from a server (e.g., a server associated with a manufacturer of the system 200 or provider of an operating system of the system 200, or a server of a third-party vendor) and may be stored in a repository, such as the memory 204 or the storage 208 of the system 200. If the comparison results in a domain name match, the monitoring process 212 may determine that the domain name is associated with the activity tracker. Otherwise, the monitoring process 212 may determine that the domain name is not associated with the activity tracker.

Subsequent to determining that the domain name is associated with the activity tracker, the monitoring process 212 may further determine whether initiation of the activity tracker was triggered by the application or the content within the application. In one or more implementations, the monitoring process 212 may identify a first network connection, from the monitored network connections, that was initiated by the application 210, and further identify a second network connection, from the monitored network connections, that was initiated by content of the application 210. In one or more implementations, the manner in which the monitoring process 212 identifies that the network connections to the activity tracker are initiated by the application 210 or the content is described in more detail below.

In an example, for each of the monitored network connections, the monitoring process 212 may obtain all or part of the data communicated via the network connection and may classify the data flowing through the network connection as being attributed to the application 210 or the content. In an example, the classification may be performed using a machine-learning model pre-trained to receive data as the input to output the data classified under the application category or the content category. In another example, the classification may be performed using tag information associated with assets of the application. The tag information may be understood as a preassigned information that identifies whether an asset of the application is marked (e.g., by the executing application code itself) as being attributed to the application 210 or the content. Upon determining that the asset associated with the data being communicated via the network is attributed to the application, the monitoring process 212 identifies that the network connection to the activity tracker was initiated by the application 210, and upon determining that the asset is attributed to the content within the application 210, the monitoring process 212 identifies that the network connection to the activity tracker was initiated by the content.

In another example, the monitoring process 212 may identify whether the network connection to the activity tracker was initiated by first application 210 or by the content based on contextual information associated with the network connection. The contextual information may be obtained via, for example, one or more predefined parameters, such as a framework used by the application, a call made to one or more APIs, etc. In one example, the contextual information may indicate that the framework used by the application is a web browser view controller, which indicates that the activity tracker was initiated by the content. In one example, the contextual information may indicate that the API call made to establish the network connection is attributed to the application 210, which indicates that the activity tracker was initiated by the application 210.

By separately identifying the network connections initiated by the application 210 and the network connections initiated by content within the application 210, the monitoring process 212 may distinguish the tracking activity that is initiated by the application 210 from the tracking activity that is initiated by the content. Based on the monitoring of the network connections and distinguishing the tracking activity initiated by the application 210 and initiated by the content, the monitoring process 212 may generate tracker monitoring information for the application 210. In one example, the tracker monitoring information may identify activity tracking initiated by the application 210. In another example, the tracker monitoring information may further identify activity tracking initiated by the content.

In an example, the classification may be performed using a machine-learning model pre-trained to receive data as the input and to classify the data as being in the application category or the content category. In another example, the classification may be performed using tag information associated with assets of the application. The tag information may be understood as a preassigned information that identifies whether an asset of the application is marked as being attributed to the application 210 or the content. Upon determining that the asset associated with the data being communicated via the network is attributed to the application, the monitoring process 212 identifies that the network connection to the activity tracker was initiated by the application 210, and upon determining that the asset is attributed to the content within the application 210, the monitoring process 212 identifies that the network connection to the activity tracker was initiated by the content.

In another example, the monitoring process 212 may identify whether the network connection to the activity tracker was initiated by the first application 210 or by the content based on contextual information associated with the network connection. The contextual information may be obtained via, for example, one or more predefined parameters, such as a framework used by the application, a call made to one or more APIs, etc. In one example, the contextual information may indicate that the framework used by the application is a web browser view controller, which indicates that the activity tracker was initiated by the content. In one example, the contextual information may indicate that the API call that was made to establish the network connection is attributed to the application 210, which indicates that the activity tracker was initiated by the application 210.

By separately identifying the network connections initiated by the application 210 and the network connections initiated by the content within the application 210, the monitoring process 212 may distinguish the tracking activity that is initiated by the application 210 from the tracking activity that is initiated by the content. Based on the monitoring of the network connections and distinguishing the tracking activity initiated by the application 210 and the content, the monitoring process 212 may generate tracker monitoring information for the application 210. In one example, the tracker monitoring information may identify activity tracking initiated by the application 210. In another example, the tracker monitoring information may further identify activity tracking initiated by the content.

The tracker monitoring information may include details of the activity tracking initiated by the application 210. The details may include, for example, a number of trackers initiated by the application 210, domain names associated with the activity trackers, etc. In an example, the tracker information may include details of the activity tracking initiated by the application 210, and separately include details (e.g., a number of trackers and associated domain names) of the activity tracking initiated by the content. Based on the tracker monitoring information, the monitoring process 212 may perform an action. The action may include, for example, storing the tracker monitoring information and/or providing the tracker monitoring information to one or more system processes for display or other purposes. In an example, the monitoring process 212 may store the tracker monitoring information and perform one or more other actions based on the stored tracker monitoring information. In another example, the monitoring process 212 may perform one or more actions in real-time or near real-time in response to monitoring the tracker information.

Figure 3:
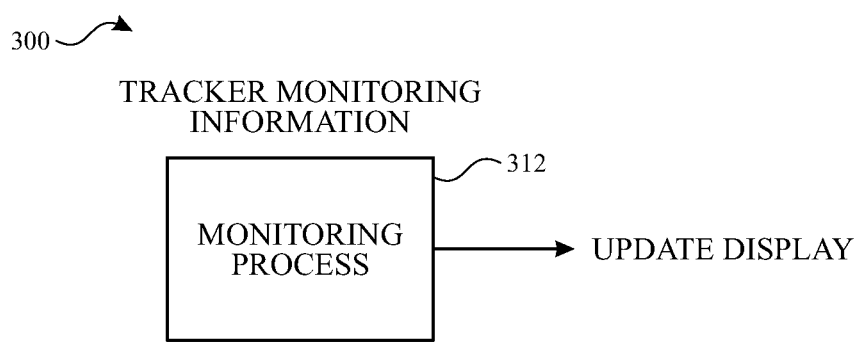
FIG. 3 illustrates an exemplary action performed based on activity tracking, in accordance with one or more implementations of the present disclosure.

FIG. 3 illustrates an exemplary action 300 that may be performed by the monitoring process 312 that corresponds to the monitoring process 212 of FIG. 2. As shown in the FIG. 3, the monitoring process 312 may update the display (e.g., a display of the device on which the monitoring process 312 is running) based on the stored tracker monitoring information. The updated display may include tracker monitoring information presented thereon. In one or more implementations, the monitoring process 312 may be configured to update the display in real-time or near real-time in response to monitoring the tracker information. Exemplary updated displays depicting the tracker monitoring information are shown in FIGS. 4-6, which are explained in further detail below.

Figure 4:
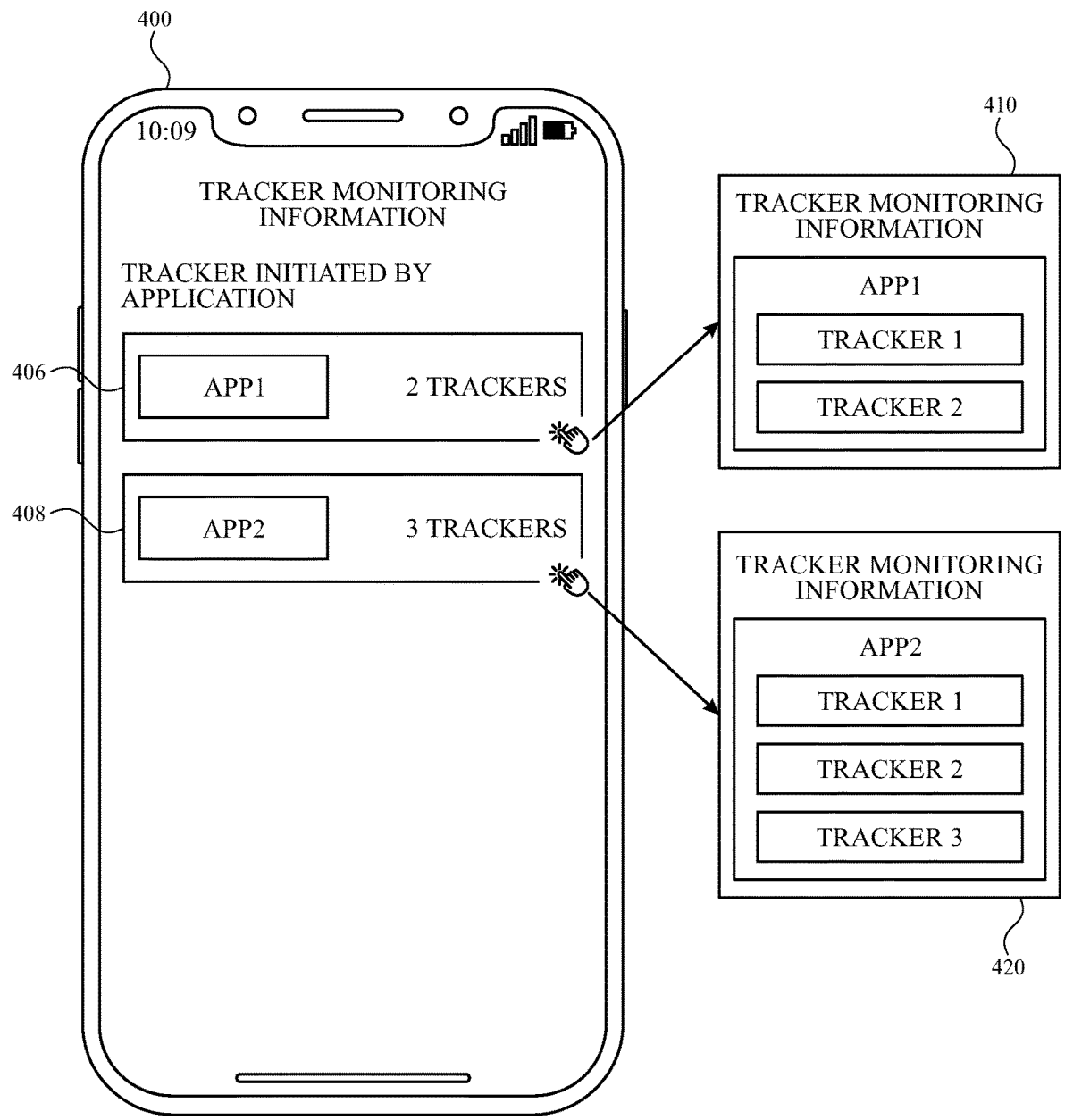
FIGS. 4-6 illustrate an example display depicting various activity tracking information, in accordance with one or more implementations of the present disclosure.

FIG. 4 illustrates an updated display 400 depicting tracker monitoring information presented thereon. The tracker monitoring information may include details (e.g., number, domain names, etc.) of the trackers initiated by the application. In one or more implementations, the monitoring process 312 may display the tracker monitoring information in a plurality of different views based on a user input corresponding to a user's customization, preference, and/or selection.

FIG. 4 shows one example view in which the tracker monitoring information may be presented on a per-app basis with, optionally, the number of trackers initiated by each app. As shown in the example of FIG. 4, 'APP1' has initiated two trackers, and 'APP2' has initiated three trackers. An option may be provided to select a particular app to view trackers initiated by that app. For example, upon selecting the element 406 corresponding to the 'APP1', an updated display 410 is presented that depicts the 'TRACKER 1' and the 'TRACKER 2' initiated by the 'APP1', and selection of the element 408 corresponding to the 'APP2' presents an updated display 420 that depicts the 'TRACKER 1', 'TRACKER 2', and 'TRACKER 3' initiated by the 'APP2'. A particular tracker from these trackers may be selected to view further details associated with that tracker.

Figure 5:
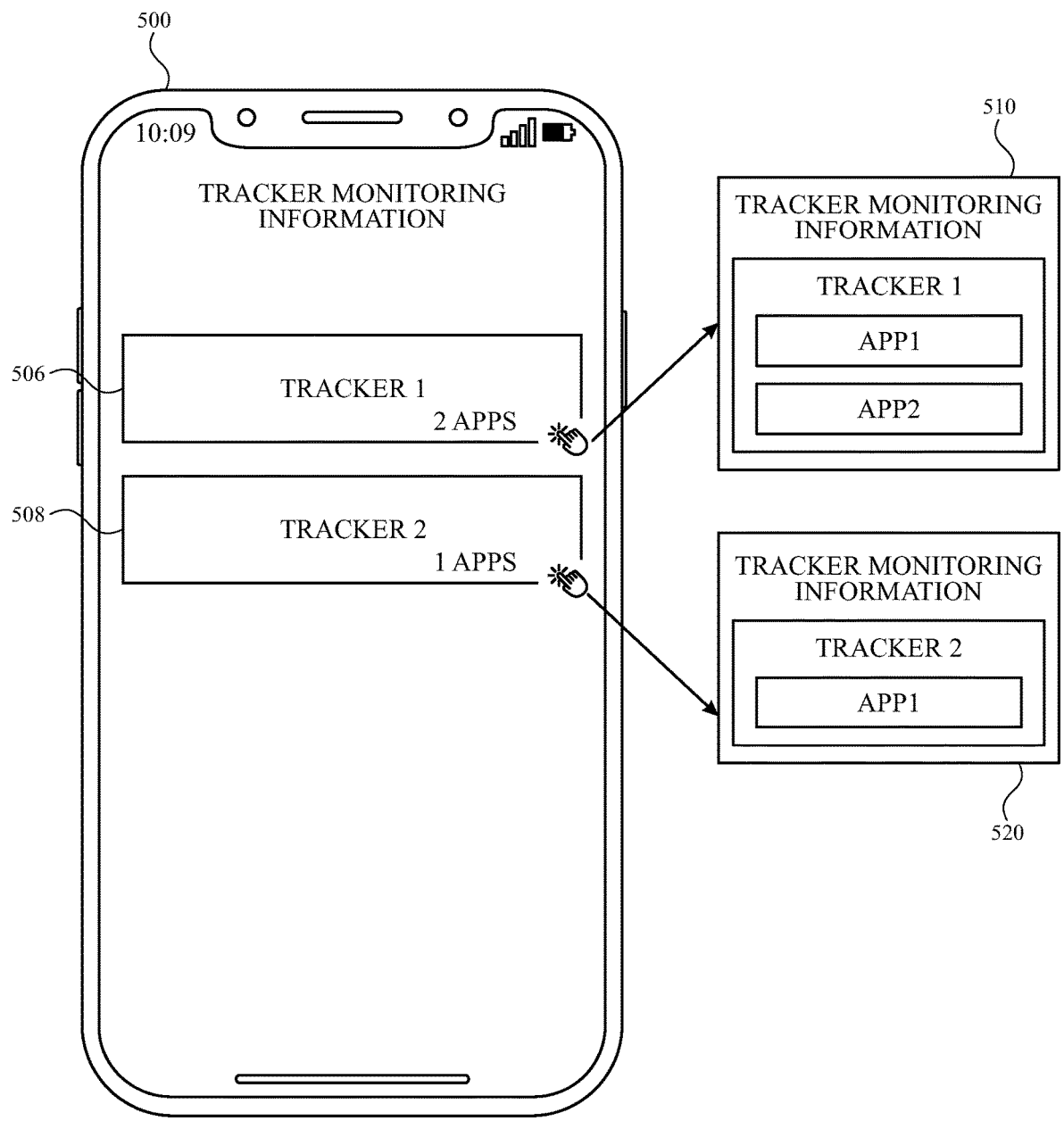
Figure 6:
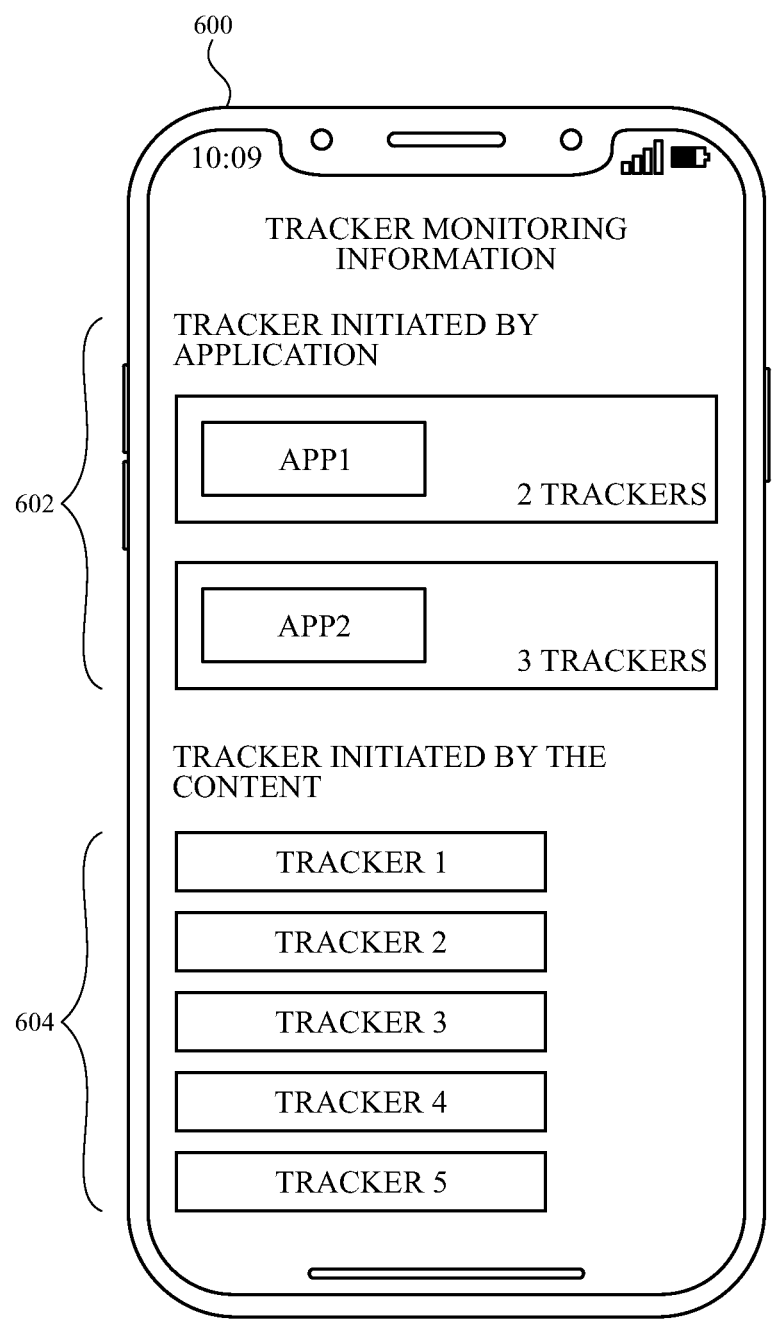

FIG. 5 shows another example view 500 in which the tracker monitoring information may be presented on a per-tracker basis with, optionally, the number of apps that have initiated a particular tracker. As shown in the example of FIG. 5, 'TRACKER 1' has been initiated by two apps, and 'TRACKER 2' has been initiated by one app. An option may be provided to select a particular tracker to view the applications initiated by that tracker. For example, upon selecting the element 506 corresponding to the 'TRACKER 1', an updated display 510 is presented that depicts the 'APP1' and the 'APP2' that initiated the 'TRACKER 1', and selection of the element 508 corresponding to the 'TRACKER 2' presents an updated display 520 that depicts the 'APP1' that initiated by the 'TRACKER 2'. A particular application from these applications may be selected to view further details associated with that application.

FIG. 6 illustrates another exemplary updated display 600 depicting the tracker monitoring information presented thereon. As shown in the example of FIG. 6, the tracker monitoring information may include details 602 of trackers initiated by applications, and separately include details 604 of trackers initiated by content of applications. As shown in the example of FIG. 6, 'APP1' has initiated two trackers and 'APP2' has initiated three trackers. Further, the updated display 600 also shows five trackers 'TRACKER 1' to 'TRACKER 5' initiated by the content.

Figure 7:
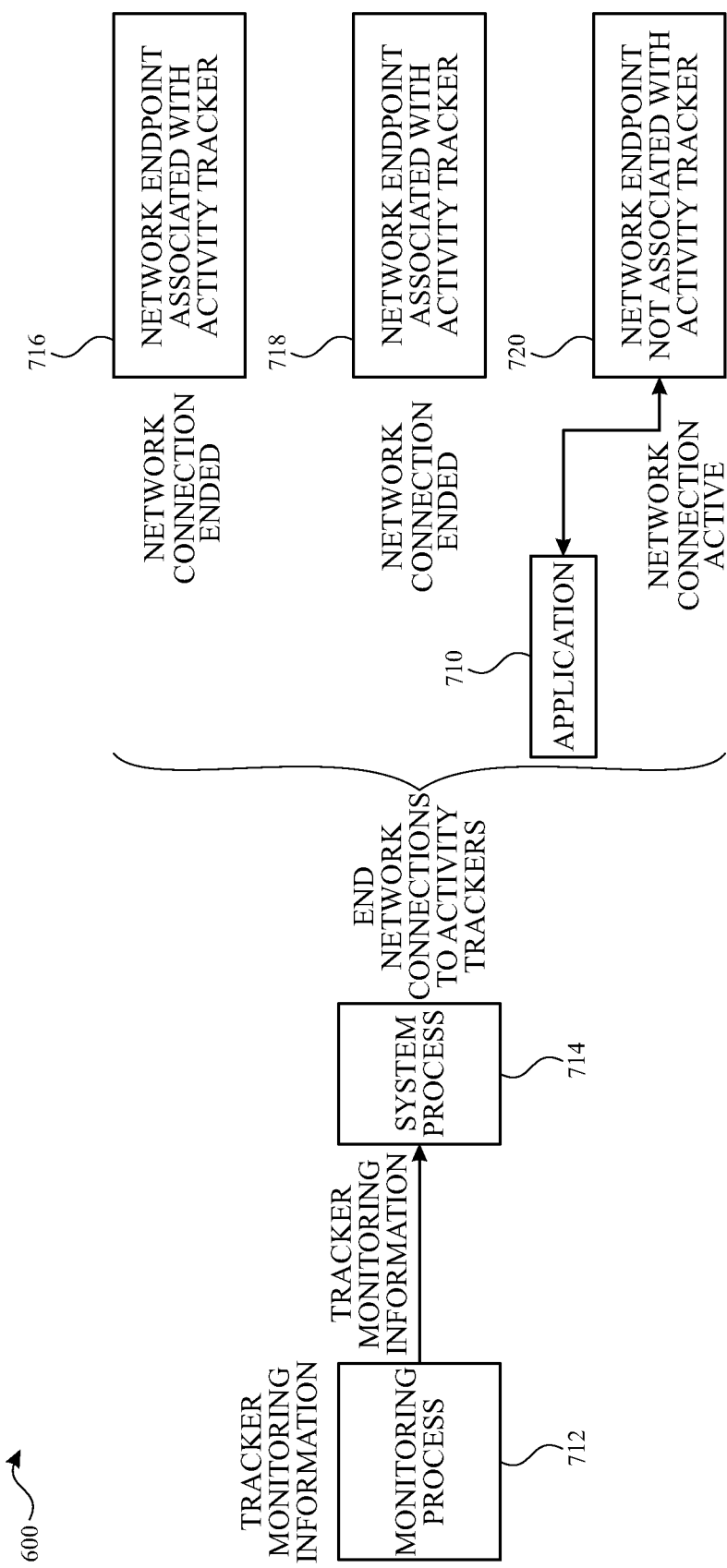
FIG. 7 illustrates an exemplary action performed based on activity tracking, in accordance with one or more implementations of the present disclosure.

FIG. 7 illustrates another exemplary action that can be performed by the monitoring process 712 that corresponds to the monitoring process 212 of FIG. 2. As shown in the FIG. 7, the monitoring process 712 may perform an action such as storing the tracker monitoring information and/or providing the tracker monitoring information to the system process 714 (e.g., system process 214 of FIG. 2), which may take a further action based on the received tracker monitoring information. For instance, the system process 714 may terminate one or more network connections, for example, the network connections that connects application 710 to network endpoints 716 and 718 associated with the activity trackers or may block associated domains names. Other network connections, for example, the network connection that connects application to network endpoint 720 not associated with the activity trackers, may remain active.

In one or more implementations, monitoring process 212 may identify encrypted network connections between the application 210 and corresponding network endpoints. Upon identifying such connections, the monitoring process 212 may generate encrypted connection information including details of the encrypted network connections. The encrypted connection information may indicate that encrypted connections were established by the application 210 and may indicate that the monitoring process 212 has no visibility on such encrypted connections. In one example, the monitoring process 212 may perform an action based on the generated encrypted information. The action may be, for example, blocking the encrypted network connections or displaying the generated encrypted information (e.g., number of encrypted connections identified) on the display of the system 200 either as a part of the tracker monitoring information or separately from the tracker monitoring information.

Figure 8:
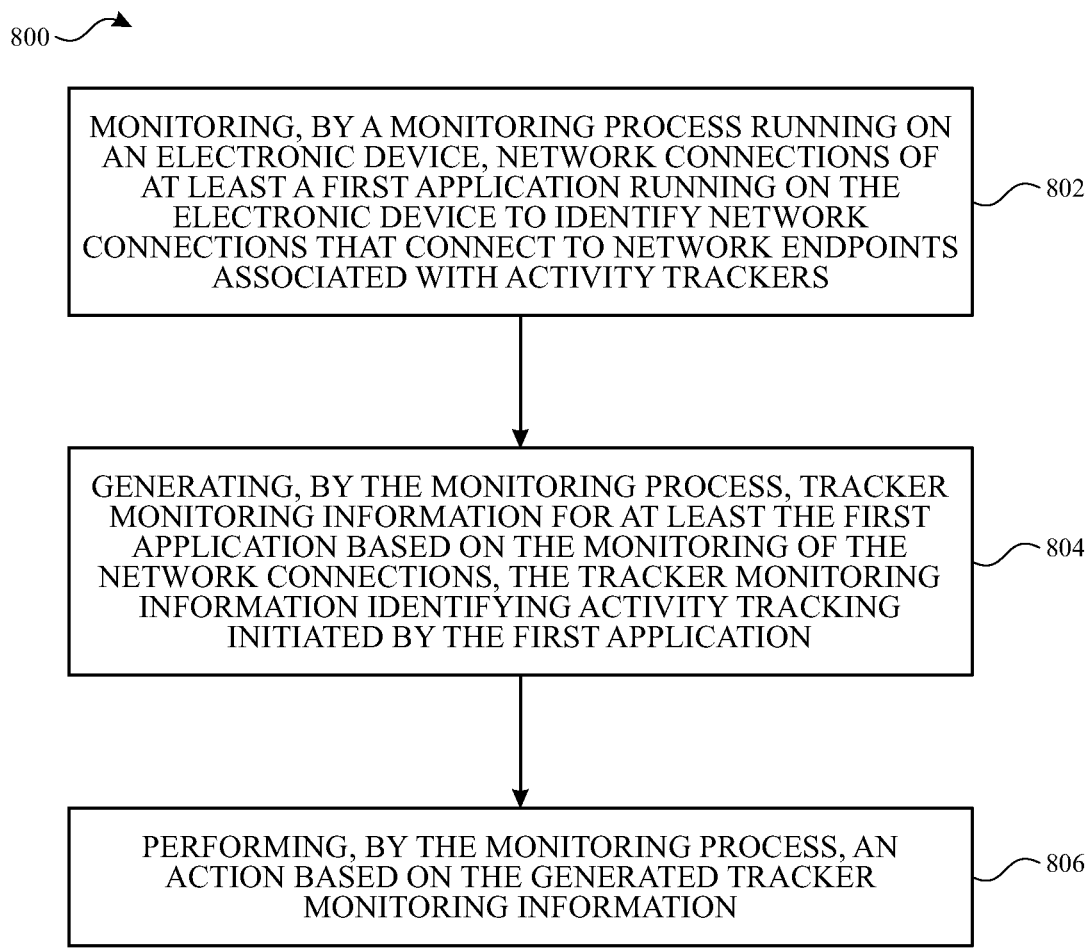
FIG. 8 illustrates a flowchart of a process of monitoring tracker activity of applications on an electronic device, in accordance with one or more implementations of the present disclosure.

FIG. 8 illustrates a flowchart of a process 800 of monitoring tracker activity for applications of an electronic device, in accordance with one or more implementations of the present disclosure. In an example, the process 800 may be implemented by the system 200. In an example, the process 800 may be implemented in a single electronic device, for example, the electronic device 110. In another example, the process 800 may be implemented in a distributed manner, without departing from the spirit and scope of the present subject matter. Furthermore, details of the operations of the process 800 which are already described herein in the above figures are not included in detail herein. Furthermore, the operations of the process 800 described herein may be implemented at the least by one or more components, for example, the processor 202 of the system 200. Further for explanatory purposes, some of the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, the process 800 includes monitoring, by a monitoring process of an electronic device (e.g., the monitoring process 212 of the system 200), network connections of at least a first application running on the electronic device to identify network connections that connect to network endpoints associated with activity trackers. In an example, the monitoring may include obtaining information associated with domain names to which the network connections are being established.

After obtaining the information related to the domain names, a determination may be made whether the domain names are associated with known activity trackers and/or currently unknown activity trackers. In an example, the determination may be performed based on a predetermined list of domain names associated with known activity trackers. Based on the determination, if a domain name is associated with a known or unknown activity tracker, the corresponding network endpoint may be identified as being associated with the activity tracker.

Subsequent to identification of the network endpoint as being associated with the activity tracker, a further determination may be made whether initiation of the network connection(s) to the activity tracker was triggered by the application itself or the content within the application. Such a determination may be made based on, for example, data communicated via the activity tracker network connection, contextual information associated with the activity tracker network connection, and/or one or more predefined parameters.

For example, the monitoring process 212 may obtain data communicated via the network connection and then classify the data communicated via the network connection into an application category or content category. In one example, the classification may be performed using a machine-learning model pre-trained (e.g., using training data corresponding to typical activity tracker behavior and/or network interactions) to receive network communications data as the input to classify the network communications data under the application category or the content category. In another example, the classification may be performed using tag information associated with the application (e.g., metadata corresponding to assets of the application) communicated via the network. For instance, an application developer may associate the tag information with different assets of the application to identify which of the assets (e.g., application components, application data, etc.) are associated with the application and which of the assets (e.g., content, banner, advertisements, etc.) are associated with the content within the application.

In one or more implementations, the monitoring process 212 may obtain contextual information associated with the application via one or more predefined parameters, such as a framework used by the application, a call made to one or more APIs, etc., and then determine based on the contextual information whether the application initiated the activity tracker or the content initiated the activity tracker. For example, the contextual information may indicate that the framework used by the application is a web browser view controller, which indicates that the activity tracker is initiated by the content.

At block 804, tracker monitoring information for at least the first application is generated based on the monitoring of the network connections. In an example, the tracker monitoring information identifies activity tracking initiated by the first application. The tracker monitoring information may include details of domain names associated with known activity trackers, and/or details of the activity tracking initiated by the first application. In an example, the tracker information may further include details of activity tracking initiated by the content within the application. Further, the tracker monitoring information may include an application identifier (e.g., an icon, and/or a name) of the application and/or a number of activity trackers initiated by the application in any suitable form. Further, the tracker monitoring information may include a content identifier (e.g., a website name) of the content and/or a number of activity trackers initiated by the content. In some examples, the tracker monitoring information may include timestamps associated with the network connections.

At block 806, an action may be performed based on the generated tracker monitoring information. In one or more implementations, the action may include storing the tracker monitoring information and/or displaying the generated tracker monitoring information with the electronic device. In one example, the tracker monitoring information on may be displayed such that the number of trackers and/or the domain names associated with the trackers initiated by the application 210 are listed in the form of a first list, and the number of trackers and/or domain names associated with the trackers initiated by the content of the application are listed in the form of a second list. The first list and the second list may be distinctly separately displayed (e.g., as in the example of FIG. 6).

In another example, the tracker monitoring information in a plurality of different views based on a user input corresponding to a user's customization, preference, and/or selection. In one example view, the tracker monitoring information may be presented on a per-app basis with an option to select a particular app to view trackers initiated that app and/or trackers initiated by the content within that app (e.g., as described above in connection with FIG. 4). A particular tracker from the trackers may be selected to view further details associated with that tracker. In another example view, the tracker monitoring information may be presented on a per-tracker basis, where the user may select a particular tracker to view which all of the applications that has initiated the selected tracker and/or content that has initiated the selected tracker (e.g., as described above in connection with FIG. 5).

In addition to the display of the tracker monitoring information and/or alternative to the display of the tracker monitoring information, the action may include providing the tracker monitoring information to the system process. In one or more implementations, the system process may take a further action based on the received tracker monitoring information. For instance, the system process may terminate one or more network connections, for example, the connections that connect to network endpoints associated with the activity trackers or may block associated domain names.

In one or more implementations, the process 800 may further include identifying at least one encrypted network connection between the first application and a network endpoint and generating encrypted-connection information including details of the at least one encrypted network connection. The encrypted-connection information may include a timestamp and a duration of the encrypted connections. This encrypted-connection information, in an example, may be displayed on the display of the electronic device and/or an action (e.g., terminating the encrypted connections) may be performed based on the encrypted information.

Figure 9:
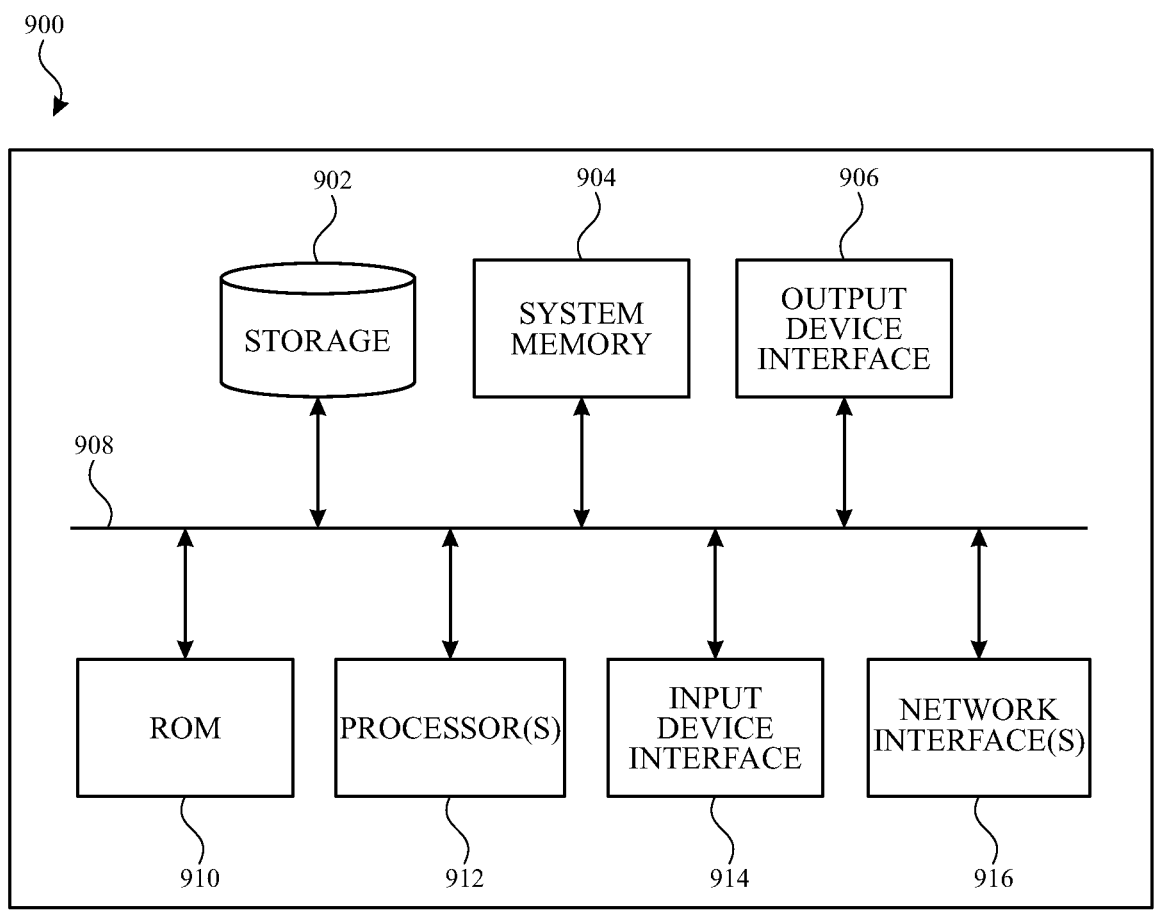
FIG. 9 illustrates an example electronic system with which aspects of the subject technology may be implemented in accordance with one or more implementations of the present disclosure.

FIG. 9 depicts a computing-device based implementation of the system of FIG. 2 in accordance with one or more implementations of the present disclosure. The system 900 can be, and/or can be a part of, the electronic device 110, and/or the network endpoint 120 shown in FIG. 1. The system 900 may include various types of computer readable media and interfaces for various other types of computer readable media. The system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the system 900. The permanent storage device 902, on the other hand, may be a read-and-write memory device. The permanent storage device 902 may be a non-volatile memory unit that stores instructions and data even when the system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the system 900. Input devices that may be used with the input device interface 914 may include, for example, alphanumeric keyboards and pointing devices (also called "cursor control devices"). The output device interface 906 may enable, for example, the display of images generated by the system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the system 900 to one or more networks and/or to one or more network nodes, such as the electronic device 110 shown in FIG. 1, through the one or more network interface(s) 916. In this manner, the system 900 can be a part of a network of computers (such as a LAN, a wide area network ("WAN"), or an Intranet, or a network of networks, such as the Internet. Any or all components of the system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

The present disclosure recognizes that the use of personal information data, in the present technology, can be used to the benefit of users. For example, the personal information tracked by the applications and/or various trackers.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of activity tracking by applications and/or various trackers associated with the application, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed implementation or embodiments, the present disclosure also contemplates that the various embodiments can also be implemented without the need for accessing such personal information data. That is, the various embodiments of the present technology are not rendered inoperable due to the lack of all or a portion of such personal information data.

In accordance with aspects of the disclosure, a method is provided that includes monitoring, by a monitoring process running on an electronic device, network connections of at least a first application running on the electronic device to identify network connections that connect to a network endpoint associated with an activity tracker; generating, by the monitoring process, tracker monitoring information for at least the first application based on the monitoring of the network connections, where the tracker monitoring information identifies activity tracking initiated by the first application; and performing, by the monitoring process, an action based on the tracker monitoring information.

In accordance with other aspects of the disclosure, a system is provided that includes a processor; and a memory device containing instructions, which when executed by the processor, cause the processor to: monitor, by a monitoring process running on the electronic device, network connections of at least a first application running on the electronic device to identify network connections that connect to a network endpoint associated with an activity tracker; generate, by the monitoring process, tracker monitoring information for at least the first application based on the monitoring of the network connections, where the tracker monitoring information identifies activity tracking initiated by the first application; and perform, by the monitoring process, an action based on the tracker monitoring information.

In accordance with other aspects of the disclosure, a non-transitory machine-readable medium is provided that includes code that, when executed by a processor, causes the processor to perform a method, the method including monitoring, by a monitoring process running on an electronic device, network connections of at least a first application running on the electronic device to identify network connections that connect to a network endpoint associated with an activity tracker; generating, by the monitoring process, tracker monitoring information for at least the first application based on the monitoring of the network connections, where the tracker monitoring information identifies activity tracking initiated by the first application; and performing, by the monitoring process, an action based on the tracker monitoring information.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the present disclosure.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
monitoring, by a monitoring process running on an electronic device, network connections of at least a first application running on the electronic device to identify network connections that connect to a network endpoint associated with an activity tracker;
generating, by the monitoring process, tracker monitoring information for at least the first application based on the monitoring of the network connections, wherein the tracker monitoring information identifies activity tracking initiated by the first application; and
performing, by the monitoring process, an action based on the tracker monitoring information.

2. The method of claim 1, wherein monitoring the network connections of the first application to identify the network connections that connect to the network endpoint associated with the activity tracker comprises:
obtaining a domain name associated with a network endpoint connected to by one of the monitored network connections of at least the first application;
comparing the domain name to a plurality of domain names corresponding to a plurality of known activity trackers to identify that the network endpoint is associated with the activity tracker; and
identifying an activity tracker network connection based on the comparing.

3. The method of claim 2, wherein generating the tracker monitoring information further comprises:
identifying the activity tracking initiated by the first application by determining that the activity tracker network connection was initiated by the first application; and
identifying additional activity tracking initiated by content of the first application by determining that an additional activity tracker network connection was initiated by the content of the first application.

4. The method of claim 3, wherein the tracker monitoring information further identifies the additional activity tracking initiated by the content of the first application.

5. The method of claim 3, wherein identifying the activity tracking initiated by the first application comprises:
determining the activity tracker network connection was initiated by the first application based on one or more of: data communicated via the activity tracker network connection, contextual information associated with the activity tracker network connection, and one or more predefined parameters.

6. The method of claim 1, wherein generating the tracker monitoring information that identifies the activity tracking initiated by the first application further comprises:
obtaining tag information associated with an asset of the first application; and
determining a first network connection of the network connections is initiated by the first application based on the tag information associated with the asset that triggered initiation of the first network connection.

7. The method of claim 1, wherein performing the action based on the tracker monitoring information comprises:
updating, by the monitoring process, a display at the electronic device based on the tracker monitoring information.

8. The method of claim 7, wherein updating the display comprises providing, for the display, the tracker monitoring information that includes details corresponding to the activity tracking initiated by the first application separately from details corresponding to activity tracking initiated by content within the first application.

9. The method of claim 1, wherein performing the action based on the tracker monitoring information comprises:
providing, by the monitoring process, the tracker monitoring information to at least one system process of the electronic device.

10. The method of claim 9, wherein in response to receiving the tracker monitoring information, the at least one system process performs another action based on the received tracker monitoring information.

11. An electronic device, comprising:
a processor; and
a memory device containing instructions, which when executed by the processor, cause the processor to:
monitor, by a monitoring process running on the electronic device, network connections of at least a first application running on the electronic device to identify network connections that connect to a network endpoint associated with an activity tracker;
generate, by the monitoring process, tracker monitoring information for at least the first application based on the monitoring of the network connections, wherein the tracker monitoring information identifies activity tracking initiated by the first application; and
perform, by the monitoring process, an action based on the tracker monitoring information.

12. The electronic device of claim 11, wherein to monitor the network connections of the first application, the memory device contains further instructions, which when executed by the processor, cause the processor to:
obtain a domain name associated with a network endpoint connected to by one of the monitored network connections of at least the first application;
compare the domain name to a plurality of domain names corresponding to a plurality of known activity trackers to identify that the network endpoint is associated with the activity tracker; and
identify an activity tracker network connection based on the comparison.

13. The electronic device of claim 12, wherein to generate the tracker monitoring information, the memory device contains further instructions, which when executed by the processor, cause the processor to:
identify the activity tracking initiated by the first application by determining that the activity tracker network connection was initiated by the first application; and
identify additional activity tracking initiated by content of the first application by determining that an additional activity tracker network connection was initiated by the content of the first application.

14. The electronic device of claim 13, wherein the tracker monitoring information further identifies the additional activity tracking initiated by the content of the first application.

15. The electronic device of claim 13, wherein to identify the activity tracking initiated by the first application, the memory device contains further instructions, which when executed by the processor, cause the processor to:
- determine the activity tracker network connection was initiated by the first application based on one or more of: data communicated via the activity tracker network connection, contextual information associated with the activity tracker network connection, and one or more predefined parameters.

16. The electronic device of claim 11, wherein the action includes updating a display at the electronic device based on the tracker monitoring information.

17. The electronic device of claim 16, wherein the display is updated to provide the tracker monitoring information that includes details corresponding to the activity tracking initiated by the first application separately from details corresponding to activity tracking initiated by content within the first application.

18. The electronic device of claim 11, wherein the action includes providing the tracker monitoring information to at least one system process of the electronic device.

19. A non-transitory machine-readable medium comprising instructions that, when executed by a processor, cause the processor to perform operations comprising:
- monitoring, by a monitoring process running on an electronic device, network connections of at least a first application running on the electronic device to identify network connections that connect to a network endpoint associated with an activity tracker;
- generating, by the monitoring process, tracker monitoring information for at least the first application based on the monitoring of the network connections, wherein the tracker monitoring information identifies activity tracking initiated by the first application; and
- performing, by the monitoring process, an action based on the tracker monitoring information.

20. The non-transitory machine-readable medium of claim 19, the operations further comprising:
- identifying the activity tracking initiated by the first application by determining that an activity tracker network connection was initiated by the first application; and
- identifying additional activity tracking initiated by content of the first application by determining that an additional activity tracker network connection was initiated by the content of the first application.

* * * * *